(12) United States Patent
Hofmann et al.

(10) Patent No.: US 7,803,893 B2
(45) Date of Patent: Sep. 28, 2010

(54) HYDROSILYLATION PROCESS IN THE PRESENCE OF RUTHENIUM CATALYZERS

(75) Inventors: Marco Hofmann, Burghausen (DE); Hans-Juergen Eberle, Munich (DE); Johann Weis, Sauerlach (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 12/296,369

(22) PCT Filed: Mar. 28, 2007

(86) PCT No.: PCT/EP2007/052964

§ 371 (c)(1), (2), (4) Date: Oct. 7, 2008

(87) PCT Pub. No.: WO2007/118773

PCT Pub. Date: Oct. 25, 2007

(65) Prior Publication Data

US 2009/0069524 A1    Mar. 12, 2009

(30) Foreign Application Priority Data

Apr. 13, 2006 (DE) .................. 10 2006 017 588

(51) Int. Cl.
C09D 183/04 (2006.01)
C07F 7/08 (2006.01)
C09K 3/00 (2006.01)
C08G 77/04 (2006.01)

(52) U.S. Cl. ........................... 528/15; 556/479
(58) Field of Classification Search ............... 528/10–31
See application file for complete search history.

(56) References Cited

U.S. PATENT DOCUMENTS

| | | | |
|---|---|---|---|
| 3,715,334 A | 2/1973 | Karstedt | |
| 3,775,452 A | 11/1973 | Karstedt | |
| 4,309,558 A | 1/1982 | Koga et al. | |
| 5,248,802 A | 9/1993 | Bank | |
| 5,559,262 A * | 9/1996 | Beatty et al. | 556/20 |
| 5,559,264 A | 9/1996 | Bowman et al. | |
| 5,674,569 A * | 10/1997 | Ohsugi et al. | 427/407.1 |
| 5,741,552 A * | 4/1998 | Takayama et al. | 427/407.1 |
| 6,534,657 B2 * | 3/2003 | Zhang | 548/101 |
| 6,653,485 B2 * | 11/2003 | Zhang | 549/221 |
| 6,682,823 B2 * | 1/2004 | Okada | 428/448 |
| 6,878,838 B2 * | 4/2005 | Lin et al. | 556/14 |
| 2003/0065117 A1 * | 4/2003 | Poreddy et al. | 526/279 |
| 2003/0144137 A1 * | 7/2003 | Zhang et al. | 502/162 |
| 2004/0072680 A1 * | 4/2004 | Zhang | 502/150 |
| 2004/0092759 A1 | 5/2004 | Westmeyer et al. | |
| 2005/0137403 A1 * | 6/2005 | Zhang et al. | 548/101 |
| 2007/0185343 A1 * | 8/2007 | Verpoort et al. | 556/30 |

FOREIGN PATENT DOCUMENTS

| | | | |
|---|---|---|---|
| DE | 2810032 A | | 9/1978 |
| EP | 0403706 A | | 12/1990 |
| JP | 06157555 A | * | 6/1994 |
| JP | 2006307077 A | * | 11/2006 |
| WO | WO 03042135 A | | 5/2003 |
| WO | WO 2006136695 A | | 12/2006 |

OTHER PUBLICATIONS

Wiles et al. Organometallics, 1996, 15, 3782-3784.*
English-language machine-translation of JP-06-157555, 2006, 5 pages.*
Tanaka et al. J. Mol. Catal. vol. 81, 1993, pp. 207-214.*
Organometallics 2003. 22, p. 1863-1867.
J. Chem. Soc. Dalton Trans. 1984, p. 2255.
Hori et al., Bull. Chem. Soc. Jpn., 1988, 81, 3011 ff.
J. Chem. Soc. Dalton Trans. 1982, p. 1019.
Organometallics 2003, 22, p. 77-82.
Organometallics 2003, 22, p. 2378-2386.
JACS 1973, 95, p. 4102-4103.
JACS 1999, 121, p. 1839-1850.
J. Chem. Soc. Dalton Trans. 1999, p. 4231-4237.
Organometallics 2002, 21, p. 4960-4964.
Organometallics 2000, 19, p. 5733-5743.
Organometallics 2000, 19, p. 5471-5476.
Organometallics 1990, 9, p. 2092-2096.
J. Chem. Soc. Dalton Trans. 1980, p. 1961-1964.
J. Chem. Soc. Dalton Trans. 1983. page 1553-1555.
Organometallics 2003, 22, p. 586-593.
Walter Noll, Chemie und Technolige der Silicone, Verlag Chemie GmbH, Weinheim/Bergstr., 1968.
Chemistry Letters 1984, p. 1161-1164.
J.C.S. Chem. Comm. 1977, p. 132-133.
Inorg. Synth., 1982, 21, p. 74.
Science of Synthesis, Georg Thieme Verlag, Stuttgart, New York, 2001, vol. 1, p. 931-972.
J. of Organometallics Chem., 1984, 272, p. 179-188.
Bogdan Marciniec et al, Comprehensive Handbook on Hydrosilylation, Oxford: Pergamon Press, 1992.
Inorganic Syntheses, 1989, 26, p. 249-258.

* cited by examiner

*Primary Examiner*—Randy Gulakowski
*Assistant Examiner*—Robert Loewe
(74) *Attorney, Agent, or Firm*—Brooks Kushman P.C.

(57) ABSTRACT

Hydrosilylatable compositions employ ruthenium compounds with a ligand sphere comprising at least two independent carbon π-bonded ligands, at least one of these ligands being selected from the group consisting of $\eta^6$-bonded arene ligands, $\eta^6$-bonded triene ligands, $\eta^4$-bonded 1,5-cyclooctadiene ligands and $\eta^4$-bonded 1,3,5-cyclooctatriene ligands as a hydrosilylation catalyst.

12 Claims, No Drawings

HYDROSILYLATION PROCESS IN THE PRESENCE OF RUTHENIUM CATALYZERS

CROSS-REFERENCE TO RELATED APPLICATION

This application is the U.S. national phase of PCT Appln. No. PCT/EP2007/052964 filed Mar. 28, 2007 which claims priority to German application DE 10 2006 017 588.3 filed Apr. 13, 2006.

BACKGROUND OF THE INVENTION

1. Field of the Invention

The invention relates to the novel use of ruthenium catalysts in transition metal-catalyzed hydrosilylation and to a hydrosilylation process in the presence of uncharged ruthenium complexes as catalysts, these complexes having at least two carbon π-bonded, unsaturated ligands on the ruthenium.

2. Description of the Related Art

The addition of Si—H-functional compounds onto compounds with aliphatic unsaturated bonds, especially C=C double bonds (hydrosilylation), has already been known for some time.

Hydrosilylation allows Si-containing organic compounds, organosilanes and organopolysiloxanes to be prepared. It is used especially in the addition-crosslinking curing of organopolysiloxanes in the silicone industry, for example for the production of elastomers, molding materials in the dental industry or antiadhesive coatings in the paper and films industry.

The catalysts used most frequently for the hydrosilylation reaction are platinum and its compounds, the platinum being used in metallic form, as metal fixed on an inorganic support, as a platinum salt or in the form of a soluble or insoluble platinum complex.

To date, for the majority of the hydrosilylation reactions performed industrially, the so-called "Karstedt catalyst" known from U.S. Pat. No. 3,715,334 and U.S. Pat. No. 3,775,452 is used, which consists predominantly of a dimeric platinum-tetramethyldivinylsiloxane complex, which can be described by the formula $[Pt_2(TMDVS)_3]$ (TMDVS=tetramethyldivinyldisiloxane). The Karstedt catalyst is prepared proceeding from hexachloroplatinic acid $H_2PtCl_6$, which is likewise frequently used as a hydrosilylation catalyst in the form of an alcoholic solution.

Since platinum is one of the most expensive noble metals, there have already been frequent efforts to use other metals and compounds thereof as catalysts in hydrosilylation. For instance, the prior art already discloses the use of the other platinum group metals Pd, Rh, Ir, Ru in hydrosilylation. However, these have to date been described as alternatives to Pt in particular as catalysts for use in the case of specific substrates.

For example, US 2004/0092759 A1 and U.S. Pat. No. 5,559,264 describe Ru catalysts, for example $RuCl_3$, $RuBr_3$, $Ru(acac)_3$, Ru/C, $Ru_3(CO)_{12}$, $[RuCl_2(CO)_3]_2$, $[Ru(COD)Cl_2]_n$ (COD=1,5-cyclooctadiene), $Ru(PPh_3)_2(CO)_2Cl_2$ and $Ru(PPh_3)_3(CO)H_2$ for the hydrosilylation of $HSi(R)_x(OR)_{3-x}$ (x=0-2) with an olefinic halide, such as allyl chloride.

EP 0403706 A2 describes the use of Ru complexes with at least one tertiary phosphine ligand, for example $Ru(CO)_3(PPh_3)_2$, $RuCl_2(PPh_3)_2$, $Ru(H)(Cl)(PPh_3)_3$, $Ru(PPh_3)_4H_2$ and $Ru(CH_2=CH_2)(PPh_3)_3$ as catalysts for the hydrosilylation of allylamines with SiH-functional silanes.

U.S. Pat. No. 5,248,802 describes the hydrosilylation of trichlorosilane with olefinic nitriles, for example acrylonitrile, in the presence of Ru-halogen or Ru-phosphine compounds, such as $RuCl_3$, $RuBr_3$, $RuI_3$, $Ru(CO)_3(PPh_3)_2$, $RuCl_2(PPh_3)_3$, $Ru(H)(Cl)(PPh_3)_3$, $RuH_2(PPh_3)_4$, $Ru(CH_2=CH_2)(PPh_3)_3$ and $RuCl_2(CO)_2(PPh_3)_2$.

Finally, DE 2810032 A1 describes the hydrosilylation of dichlorosilane with olefins in the presence of Ru complexes, for example $RuCl_2(PPh_3)_3$, $Ru(H)(Cl)(PPh_3)_3$, $RuH_3(PPh_3)_3[Si(OMe)_3]$, $RuH_3(PPh_3)_3[Si(OMe)_2Ph]$ and $RuH_2(PPh_3)_4$.

However, the use of other compounds with transition metals, such as Ni, Co or Fe, as catalysts for hydrosilylations has also already been described. In general, these catalysts, however, are distinctly inferior to the common Pt catalysts with regard to reactivity and selectivity; especially for the crosslinking of polysiloxanes by means of a hydrosilylation reaction, the rate and selectivity of the non-Pt catalysts described to date for the hydrosilylation is generally insufficient. From an economic point of view too, these systems are usually not necessarily advantageous, since higher catalyst concentrations have to be employed for the non-platinum catalysts, and, in the case of rhodium, even higher costs than for platinum are to be expected.

SUMMARY OF THE INVENTION

It was thus an object of the invention to provide an alternative hydrosilylation catalyst. More particularly, it was an object of the invention to provide a catalyst which is superior both from an economic point of view and with regard to reactivity and selectivity to the non-platinum hydrosilylation catalysts described to date in the prior art and thus constitutes an alternative to the Pt catalysts known from the prior art. It has surprisingly been found that these and other objects are achieved by a particular class of uncharged ruthenium complexes.

DETAILED DESCRIPTION OF THE PREFERRED EMBODIMENTS

The invention provides for the use of ruthenium compounds which have at least two independent carbon π-bonded ligands, at least one of these ligands being selected from the group comprising $\eta^6$-bonded arene ligands, $\eta^6$-bonded triene ligands, $\eta^4$-bonded 1,5-cyclooctadiene ligands and $\eta^4$-bonded 1,3,5-cyclooctatriene ligands, as hydrosilylation catalysts.

$\eta_6$-Bonded triene ligands are understood to mean conjugated or nonconjugated—preferably conjugated—triolefins which form π-complexes with the central ruthenium atom with their double bonds.

Even though ruthenium compounds of this class are already known from the prior art and their use as catalysts has been described, their use as hydrosilylation catalysts has not been reported to date. For instance, Hori et al. in Bull. Chem. Soc. Jpn. (1988), 61, 3011 ff., reports that ruthenium compounds of this class can be used as catalysts in the reaction of olefins with SiH-functional silanes to prepare vinyl- or allyl silanes and for olefin hydrogenation, but does not report their use as hydrosilylation catalysts. It is therefore completely surprising that the compounds useable in accordance with the invention have been found to be effective hydrosilylation catalysts, especially in conjunction with oxygen-substituted silicon compounds as substrates, preferably oxygen-substituted Si—H-functional and/or oxygen-substituted Si-vinyl-functional compounds, for example Si—H— or Si-vinyl-functional alkoxy silanes and/or Si—H— or Si-vinyl-functional siloxane compounds, most preferably in the crosslinking of polysiloxanes.

The invention further provides a process for hydrosilylation (hydrosilylation process) in the presence of a ruthenium catalyst, characterized in that the ruthenium catalyst has at least two independent carbon π-bonded ligands, at least one of these ligands being selected from the group comprising $\eta^6$-bonded arene ligands, $\eta^6$-bonded triene ligands, $\eta^4$-bonded 1,5-cyclooctadiene ligands and $\eta^4$-bonded 1,3,5-cyclooctatriene ligands.

The characterizing feature of the catalysts from the group of the ruthenium-olefin complexes newly used for hydrosilylation is that their ligand sphere has at least two independent carbon π-bonded (olefinic), unsaturated ligands on the ruthenium, of which at least one is an $\eta^6$-bonded arene or triene ligand or is an $\eta^4$-bonded 1,5-cyclooctadiene or 1,3,5-cyclooctatriene ligand.

The ruthenium center in these complexes may in principle be present in all oxidation states common for organometallic ruthenium complexes, especially in the 0, +II, +III, +IV oxidation states. Preference is given to complexes with the 0 and +II oxidation states of ruthenium.

The ruthenium (Ru) compounds are generally present in the form of 18-electron complexes and the compounds are generally uncharged.

Among the π-bonded ligands, generally at least one is bonded in a labile manner such that the hydrosilylation catalysis cycle can be started rapidly with displacement of this ligand or of one of its coordination sites, and therefore only very short induction periods are present in most cases. The other π-bonded ligand(s) may serve to stabilize the electronically unsaturated Ru fragment and can be selected and optimized especially with regard to good compatibility with the substrates used, especially with regard to the aspects of solubility and miscibility.

The use of the inventive compounds as catalysts in hydrosilylation is notable especially for the fact that the catalysts are very active catalysts which are nevertheless free of platinum.

The following advantages should be specially emphasized:
high activity coupled with simultaneously moderate catalyst concentrations needed
the compounds are generally completely or at least partly miscible into polysiloxanes to be hydrosilylated.
The crosslinking of polysiloxanes is possible both in bulk and in thin layers.
Generally already high catalytic activity even at room temperature The synthesis of the inventive Ru complexes is known in principle to those skilled in the art from the prior art and has been described for fundamental representatives of this compound class (for example in Science of Synthesis, 2001, Georg Thieme Verlag, Stuttgart, N.Y., Volume 1, p. 931-972).

Possible embodiments of the inventive catalysts can be selected from the group comprising (a) Ru(0) complexes with $\eta^6$-bonded arene or triene ligands and at least one further carbon π-bonded ligand;

(b) Ru(0) complexes with $\eta^4$-bonded 1,5-cyclooctadiene or 1,3,5-cyclooctatriene ligands and at least one further carbon π-bonded ligand.

Within the class of the Ru(0) complexes with $\eta^6$-bonded arene or triene ligands and at least one further carbon π-bonded ligand, possible embodiments can be selected from the following types:

Compounds of the General Formula (1)

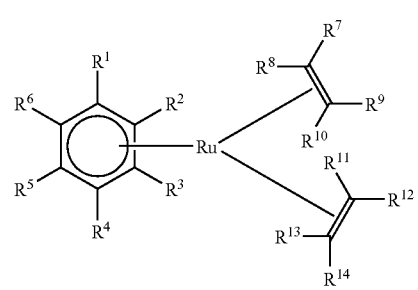

Formula (1)

where $R^1$ to $R^6$ are each independently selected from the group comprising hydrogen (H); alkyl; aryl; halogen; OR' where R' in turn is selected from the group comprising hydrogen (H), alkyl and aryl; $CO_2R''$ where R'' in turn is selected from the group comprising hydrogen (H) and alkyl; CHO and C(O)R''' where R''' in turn is selected from the group comprising alkyl and aryl, with the proviso that two adjacent $R^1$ to $R^6$ radicals may optionally form a further ring, thus forming, for example, a naphthyl radical; and $R^7$ to $R^{14}$ are each independently selected from the group comprising hydrogen (H); alkyl; aryl; halogen; silyl; siloxy; CN; $CO_2R''$ where R'' in turn is selected from the group comprising hydrogen (H) and alkyl; CHO and C(O)R''' where R''' in turn is selected from the group comprising alkyl and aryl, with the proviso that radicals from $R^7$ to $R^{10}$ and from $R^{11}$ to $R^{14}$— with or without additional spacers—may optionally be joined to one another, thus forming, overall, a polydentate acyclic or cyclic ligand, for example 1,3-cyclohexadiene or 1,5-cyclooctadiene.

Specific embodiments of compounds of the general formula (1) are:

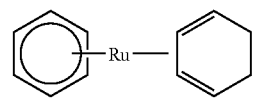

($\eta^6$-$C_6H_6$) Ru ($\eta^4$-$C_6H_8$)
Lit.: Chem. Commun. 1977, 132-133.
J. Chem. Soc., Dalton Trans. 1980, 1961.
Organometallics 2000, 19, 5471-5476.

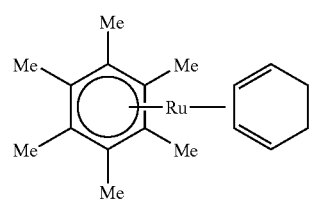

($\eta^6$-$C_6Me_6$) Ru ($\eta^4$-$C_6H_8$)
Lit.: Inorg. Synth. 1982, 21, 74

-continued

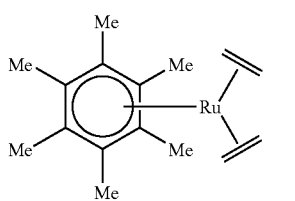

(η⁶-C₆Me₆) Ru (η⁴-C₂H₄)₂
Lit.: Inorg. Synth. 1982, 21, 74

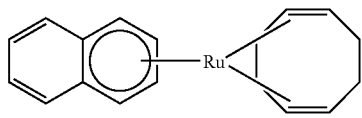

(η⁶-C₁₀H₈) Ru (η⁴-COD) (COD = 1,5-cyclooctadiene)
Lit.: J. Chem. Soc., Dalton Trans. 1982, 1019,
J. Chem. Soc., Dalton Trans. 1984, 2255

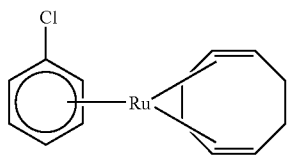

(η⁶-C₆H₅Cl) Ru (COD) (COD = 1,5-cyclooctadiene)
Lit.: J. Chem. Soc., Dalton Trans. 1984, 2255

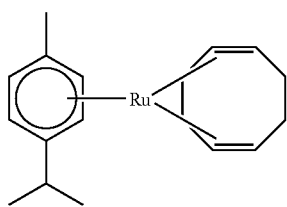

(η⁶-cymene) Ru (COD) (COD = 1,5-cyclooctadiene)
Lit.: Organometallics 2003, 22, 586-593

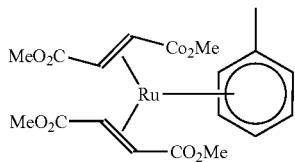

(η⁶-toluene) Ru (dmfm)₂ (dmfm = dimethyl fumarate)
Lit.: Organometallics 2003, 22, 1863-1867

Compounds of the General Formula (2)

Formula (2)

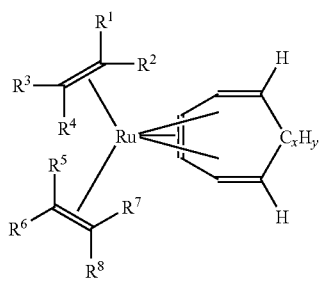

where $R^1$ to $R^8$ are each independently selected from the group comprising hydrogen (H); alkyl; aryl; halogen; silyl; siloxy; CN; CO₂R″ where R″ in turn is selected from the group comprising hydrogen (H) and alkyl; CHO; C(O)R‴ where R‴ here in turn is selected from the group comprising alkyl, aryl and NR₂ where R in turn is selected from hydrogen (H) and alkyl, with the proviso that radicals from $R^1$ to $R^4$ and $R^5$ to $R^8$—with or without additional spacers—may optionally be joined to one another, thus forming, overall, a polydentate acyclic or cyclic ligand, for example 1,5-cyclooctadiene or norbornadiene; and x=1 and y=2 (corresponding to cycloheptatriene);

x=2 and y=2 (corresponding to cyclooctatetraene); or x=2 and y=4 (corresponding to cyclooctatriene).

Specific embodiments of compounds of the general formula (2) are:

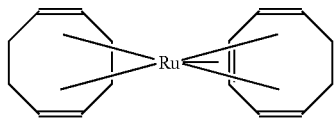

Ru (η⁴-COD) (η⁶-COT) (COD = 1,5-cyclooctadiene, COT = 1,3,5-cyclooctatriene)
Lit.: JOM 1984, 272, 179

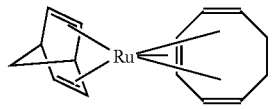

Ru (η⁶-COT) (η⁴-nbd)
(COT = cyclooctatriene, nbd = norbornadiene)

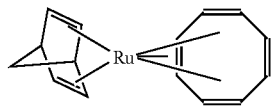

Ru (η⁶-cyclooctatetraene) (η⁴-nbd)
(nbd = norbornadiene)
Lit.: JACS 1973, 95, 4102-4103

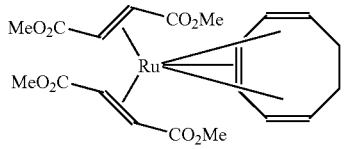

Ru (η⁶-COT) (η²-dmfm)₂ (COT = cyclooctatriene, dmfm = dimethyl fumarate)
Lit.: JACS 1999, 121, 1839-1850

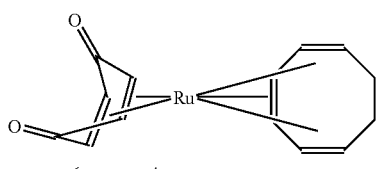

Ru (η⁶-COT) (η⁴-p-benzoquinone) (COT = cyclooctatriene)
Lit.: Organometallics 2003, 22, 77-82.

Compounds of the General Formula (3)

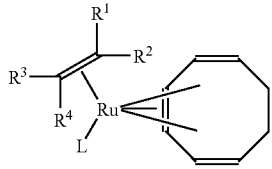

Formula (3)

where $R^1$ to $R^4$ are each independently selected from the group comprising hydrogen (H); alkyl; aryl; halogen; silyl; siloxy; CN; $CO_2R''$ where $R''$ in turn is selected from the group comprising hydrogen (H) and alkyl; CHO and $C(O)R'''$ where $R'''$ in turn is selected from the group comprising alkyl and aryl; and L is selected from the group comprising $PR'''_3$ and $P(OR''')_3$, where $R'''$ here in turn is selected from alkyl and aryl; $NR_2H$ where R here in turn is selected from hydrogen (H), alkyl and alkylaryl; morpholine and pyridine.

Specific embodiments of compounds of the general formula (3) are:

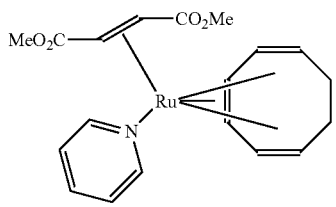

Ru ($\eta^6$-COT) (py) ($\eta^2$–dmfm)
(COT = cyclooctatriene, py =
pyridine, dmfm = dimethyl fumarate)
Lit.: J.Chem. Soc.,
Dalton Trans. 1999, 4231

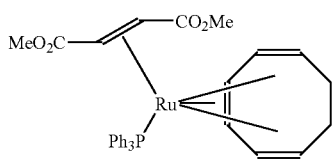

Ru ($\eta^6$-COT) (PPh3) ($\eta^2$–dmfm)
(COT = cyclooctatriene, dmfm =
dimethyl fumarate)
Lit.: Organometallics 2000,
19, 5733

Within the class of the Ru(0) complexes with $\eta^4$-bonded 1,5-cyclooctadiene or 1,3,5-cyclooctatriene ligands and at least one further carbon π-bonded ligand, possible embodiments can be selected from the following types:

Compounds of the General Formula (4)

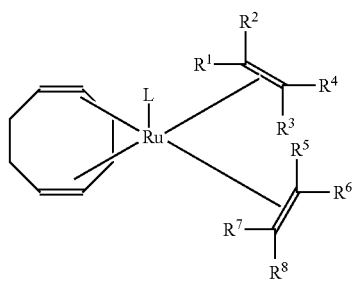

Formula (4)

where $R^1$ to $R^8$ are each independently selected from the group comprising hydrogen (H); alkyl; aryl; halogen; silyl; siloxy; CN; $CO_2R''$ where $R''$ in turn is selected from the group comprising hydrogen (H) and alkyl; CHO and $C(O)R'''$ where $R'''$ in turn is selected from the group comprising alkyl and aryl, with the proviso that radicals from $R^1$ to $R^4$ and $R^5$ to $R^8$—with or without additional spacers—may optionally be joined to one another, thus forming, overall, a polydentate acyclic or cyclic ligand, for example 1,3,5-cyclooctatriene; and L is selected from the group comprising CO; $CNR'''$ where $R'''$ in turn is selected from the group comprising alkyl and aryl; $PR'''_3$ and $P(OR''')_3$, where $R'''$ in turn is selected from the group comprising alkyl and aryl; ligands containing N donors, for example acetonitrile, benzonitrile, pyridine; ligands containing S donors, for example dimethyl sulfoxide; and ligands containing O donors, for example tetrahydrofuran.

Specific embodiments of compounds of the general formula (4) are:

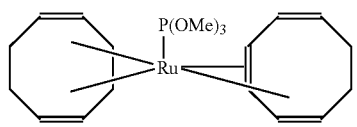

Ru ($\eta^4$-COD) ($\eta^4$-COT) [P(OMe)3] (COD =
cyclooctadiene, COT = cyclooctatriene)
Lit.: J. Chem. Soc., Dalton Trans. 1983, 1553
Organometallics 2003, 22, 2378-2386

Compounds of the General Formula (5)

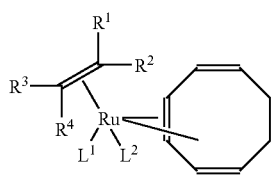

Formula (5)

where $R^1$ to $R^4$ are each independently selected from the group comprising hydrogen (H); alkyl; aryl; halogen; silyl; siloxy; CN; $CO_2R''$ where $R''$ in turn is selected from the group comprising hydrogen (H) and alkyl; CHO and $C(O)R'''$ where $R'''$ in turn is selected from the group comprising alkyl and aryl; and $L^1$ and $L^2$ are each independently selected from CO; CNR''', where R''' in turn is selected from the group comprising alkyl and aryl; PR'''$_3$ and P(OR''')$_3$, where R''' in turn is selected from the group comprising alkyl and aryl, ligands containing N donors, for example acetonitrile, benzonitrile, pyridine; ligands containing S donors, for example dimethyl sulfoxide; and ligands containing O donors, for example tetrahydrofuran, with the proviso that $L^1$ and $L^2$ may optionally also be joined to one another and may form a ring.

Specific embodiments of compounds of the general formula (5) are:

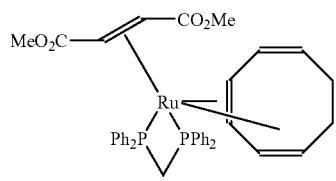

Ru ($\eta^4$-COT) (dmfm) ($\eta^2$–dppm)
(COT = cyclooctatriene, dmfm = dimethyl fumarate, dppm = bis(diphenylphosphino)methane)
Lit.: Organometallics 2002, 21, 4960

Compounds of the General Formula (6)

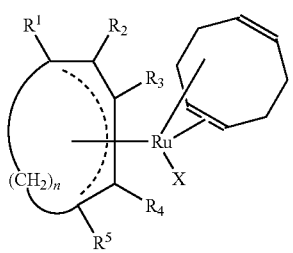

Formula (6)

where $R^1$ to $R^5$ are each independently selected from the group comprising hydrogen (H); alkyl; aryl; and the dotted line in the general formula (6) represents one or more conjugated or nonconjugated double bonds; and n is 0, 2 or 3; and X is any monovalent anionic ligand, especially selected from the group comprising halide and acetate.

Specific embodiments of compounds of the general formula (6) are:

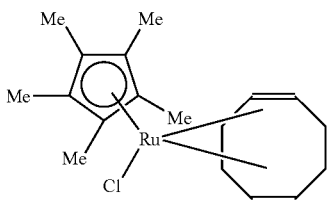

Ru ($\eta^4$-COD) (C$_5$Me$_5$) Cl
(COD = cyclooctadiene)
Lit.: Chem. Lett. 1984, 1161.

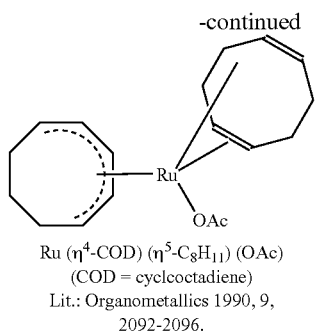

Ru ($\eta^4$-COD) ($\eta^5$-C$_8$H$_{11}$) (OAc)
(COD = cyclooctadiene)
Lit.: Organometallics 1990, 9, 2092-2096.

Compounds of the General Formula (7)

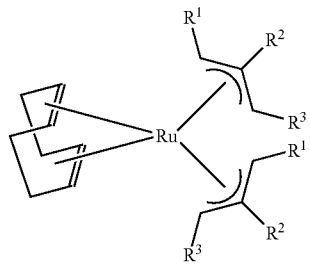

Formula (7)

where $R^1$ to $R^3$ are each independently selected from the group comprising hydrogen (H) and alkyl.

Specific embodiments of compounds of the general formula (7) are:

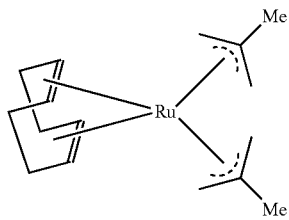

Ru ($\eta^4$-COD) ($\eta^3$-methallyl)$_2$ (COD = cyclooctadiene)
Lit.: Inorg. Synth. 1989, 26, 249-258

The inventive catalysts, especially those of the general formulae (1) to (7) and the specific embodiments mentioned, are generally used in such an amount as to give rise to an Ru content of 10-1000 ppm, preferably 50-500 ppm, based on the total mass of the reacting substrates.

The hydrosilylation reactions using the inventive catalysts are effected generally at temperatures between room temperature, especially 20° C., and 200° C., preferably between 50° C. and 120° C., and a pressure of 900 to 1100 hPa. However, it is also possible to employ higher or lower temperatures and pressures.

When crosslinking polysiloxanes, it is advantageous to homogenize the catalyst as thoroughly as possible in the vinyl-functional polysiloxane before the reaction. This can be done by means of external assistants, for example ultrasound treatment in an ultrasound bath, or by dissolving the inventive Ru catalysts in a suitable organic solvent which is preferably low-boiling and especially boils below 100° C., for example dichloromethane or tetrahydrofuran, subsequent mixing into the vinyl-functional polysiloxane and final drawing off of the solvent under reduced pressure.

Also suitable are very small amounts of a higher-boiling organic solvent, especially one which boils above 100° C., for example toluene, or of a siloxane, for example octamethylcyclotetrasiloxane (D4), which subsequently remains in the mixture to be crosslinked.

The hydrosilylation reactions can be performed either under air or under an inert gas atmosphere (nitrogen, argon), preference being given to reaction under inert gas atmosphere.

The process according to the invention and the inventive use of the ruthenium catalysts can generally be effected in all hydrosilylation reactions which are known to the person skilled in the art from the prior art and are described, for example, in Walter Noll "Chemie und Technologie der Silicone" [Chemistry and Technology of the Silicones], Verlag Chemie GmbH, Weinheim/Bergstr. 1968; Bogdan Marciniec, "Comprehensive Handbook on Hydrosilylation", Oxford: Pergamon Press, 1992, and they are generally used in all hydrosilylatable, especially crosslinkable, compositions known from the prior art.

The inventive use of the catalysts and the process according to the invention are suitable both for the synthesis of low molecular weight compounds and for the curing of higher molecular weight compounds, especially of polymers with unsaturated groups, especially with carbon-carbon double bonds.

In particular, those hydrosilylation reactions in which C=C-functional polysiloxanes are reacted with SiH-functional polysiloxanes or C=C-functional organosilanes are reacted with SiH-functional organosilanes are catalyzed.

Preference is given in particular to the reaction of vinyl-terminal polydimethylsiloxanes with SiH-functional polysiloxanes of the general formula $Me_3SiO-[Si(H)(Me)O]_x-SiMe_3$, where x is from 1 to 500, especially from 1 to 100, and of Si-vinyl-functional organosilanes with Si—H-functional organosilanes.

Specific examples of Si-vinyl-functional organosilanes which can be hydrosilylated by the process according to the invention or with the inventive use of the catalysts include vinyltrimethylsilane, vinyltriethoxysilane, vinylmethyldiethoxysilane, vinylmethyldimethoxysilane, vinyltrichlorosilane.

Specific examples of SiH-functional organosilanes include $HSi(OR')_3$ where R' is an alkyl radical, $HSi(Me)_{3-x}Cl_x$ where x is from 1 to 3, and $HSiR''_3$ where R'' is an alkyl or aryl radical.

The invention further relates to hydrosilylatable compositions comprising (A) a compound with at least one aliphatically unsaturated carbon-carbon bond, (B) a compound with at least one silicon-hydrogen bond and (D) a ruthenium compound which is characterized in that its ligand sphere comprises at least two independent carbon π-bonded (unsaturated) ligands, at least one of these ligands being selected from the group comprising $\eta^6$-bonded arene ligands, $\eta^6$-bonded triene ligands, $\eta^4$-bonded 1,5-cyclooctadiene ligands and $\eta^4$-bonded 1,3,5-cyclooctatriene ligands.

A preferred embodiment of the hydrosilylatable compositions concerns polyorganosiloxane compositions comprising (A) polyorganosiloxanes which have radicals with aliphatic carbon-carbon multiple bonds, (B) polyorganosiloxanes with Si-bonded hydrogen atoms or instead of (A) and (B)

(C) polyorganosiloxanes which comprise SiC-bonded radicals with aliphatic carbon-carbon multiple bonds and Si-bonded hydrogen atoms, and (D) a ruthenium compound which is characterized in that its ligand sphere comprises at least two independent carbon π-bonded (unsaturated) ligands, at least one of these ligands being selected from the group comprising $\eta^6$-bonded arene ligands, $\eta^6$-bonded triene ligands, $\eta^4$-bonded 1,5-cyclooctadiene ligands and $\eta^4$-bonded 1,3,5-cyclooctatriene ligands.

The ruthenium compound of component (D) functions in each case as a hydrosilylation catalyst (ruthenium catalyst). Preference is given to using compounds of the general formula (1) to (7), especially one or more of the above-specified embodiments.

Hydrosilylatable compositions are especially crosslinkable compositions.

Components (A), (B) and (C) described for the hydrosilylatable compositions correspond to the compounds (reactants) to be converted in the process according to the invention. Both the inventive compositions and the processes according to the invention and the use are based on the same inventive ruthenium catalysts.

The process according to the invention for hydrosilylation is carried out by supplying energy, especially by supplying heat. The same applies to the inventive hydrosilylatable compositions.

The inventive hydrosilylatable compositions preferably comprise compounds which have at least one aliphatically unsaturated carbon-carbon bond and are selected from the group comprising vinyl-functional organosilanes and vinyl-terminal polydimethylsiloxanes, and compounds having at least one silicon-hydrogen bond which are selected from the group comprising SiH-functional polysiloxanes and Si—H-functional organosilanes.

The invention likewise relates to silicone elastomers obtainable by crosslinking the above-described inventive hydrosilylatable compositions, especially the polyorganosiloxane compositions described.

The invention likewise relates to coatings, especially antiadhesive coatings, for example for producing release, backing and interleaving papers obtainable by crosslinking the above-described inventive hydrosilylatable compositions, especially the polyorganosiloxane compositions described.

The invention likewise relates to polysiloxane or organosilane compositions which are produced by the process according to the invention and are usable, for example, for producing dental imprints, adhesives, release liners, flat gaskets, sealants and coatings.

As is well known, the compounds (A) and (B) or (C) used in the inventive compositions are selected such that crosslinking is possible. For example, compound (A) has at least two aliphatically unsaturated radicals and siloxane (B) at least three Si-bonded hydrogen atoms, or compound (A) has at least three aliphatically unsaturated radicals and siloxane (B) at least two Si-bonded hydrogen atoms, or else, instead of compound (A) and (B), siloxane (C) is used, which has aliphatically unsaturated radicals and Si-bonded hydrogen atoms in the abovementioned ratios.

The compound (A) used in accordance with the invention may also be silicon-free organic compounds with preferably at least two aliphatically unsaturated groups, and also organosilicon compounds having preferably at least two aliphatically unsaturated groups. Examples of organic compounds which can be used as component (A) in the inventive compositions are 1,3,5-trivinylcyclohexane, 2,3-dimethyl-1,3-butadiene, 7-methyl-3-methylene-1,6-octadiene, 2-methyl-1,3-butadiene, 1,5-hexadiene, 1,7-octadiene, 4,7-methylene-4,7,8,9-tetrahydroindene, methylcyclopentadiene, 5-vinyl-2-norbornene, bicyclo[2.2.1]-hepta-2,5-diene, 1,3-diisopropenylbenzene, vinyl-containing polybutadiene, 1,4-divinylcyclohexane, 1,3,5-triallylbenzene, 1,3,5-trivinylbenzene, 1,2,4-trivinylcyclohexane, 1,3,5-triisopropenylbenzene, 1,4-divinylbenzene, 3-methyl-1,5-heptadiene, 3-phenyl-1,5-hexadiene, 3-vinyl-1,5-hexadiene, and 4,5-dimethyl-4,5-diethyl-1,7-octadiene, N,N'-methylenebis(acrylamide), 1,1,1-tris(hydroxymethyl)propane triacrylate, 1,1,1-tris(hydroxymethyl)propane trimethacrylate, tripropylene glycol diacrylate, diallyl ether, diallylamine, diallyl carbonate, N,N'-diallylurea, triallylamine, tris(2-methylallyl)amine, 2,4,6-triallyloxy-1,3,5-triazine, triallyl-s-triazine-2,4,6(1H,3H,5H)-trione, diallyl malonate, polyethylene glycol diacrylate, polyethylene glycol dimethacrylate, poly(propylene glycol) methacrylate.

However, the inventive silicone compositions preferably comprise, as constituent (A), an aliphatically unsaturated organosilicon compound, for which all aliphatically unsaturated organosilicon compounds used to date in addition-crosslinking compositions may be used, and also, for example, silicone block copolymers with urea segments, silicone block copolymers with amide segments and/or imide segments and/or ester amide segments and/or polystyrene segments and/or silarylene segments and/or carborane segments and silicone graft copolymers with ether groups.

The organosilicon compounds (A) used, which have SiC-bonded radicals with aliphatic carbon-carbon multiple bonds, are preferably linear or branched organopolysiloxanes composed of units of the average general formula (X)

  formula (X)

where
R may be the same or different and is an organic radical free of aliphatic carbon-carbon multiple bonds,
$R^y$ may be the same or different and is a monovalent, optionally substituted, SiC-bonded hydrocarbon radical with an aliphatic carbon-carbon multiple bond,
a is 0, 1, 2 or 3 and
b is 0, 1 or 2, with the proviso that the sum of a+b is less than or equal to 3, and an average of at least 2 $R^y$ radicals are present per molecule.

The R radicals in the general formula (X) may be mono- or polyvalent radicals, in which case the polyvalent radicals, such as bivalent, trivalent and tetravalent radicals, may join a plurality of, for instance two, three or four, siloxy units of the general formula (X) to one another.

R includes especially the monovalent radicals —F, —Cl, —Br, —$OR^x$, —CN, —SCN, —NCO and SiC-bonded, optionally substituted hydrocarbon radicals which may be interrupted by oxygen atoms or the —C(O)— group, and also bivalent radicals Si-bonded on both sides of the general formula (X). $R^x$ is generally hydrogen or a monovalent, optionally substituted hydrocarbon radical having from 1 to 20 carbon atoms, preferably hydrogen, alkyl radicals and aryl radicals.

Examples of $R^x$ radicals are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n nonyl radical, decyl radicals such as the n-decyl radical, cycloalkyl radicals such as the cyclopropyl, cyclopentyl, cyclohexyl, cycloheptyl and methylcyclohexyl radicals, unsaturated radicals such as the allyl, 5-hexenyl, 7-octenyl, cyclohexenyl and styryl radicals, aryl radicals such as phenyl radicals, o-, m- or p-tolyl radicals, xylyl radicals and ethylphenyl radicals, and aralkyl radicals such as the benzyl radical and the α- and β-phenylethyl radicals.

Examples of halogenated $R^x$ radicals are haloalkyl radicals such as the 3,3,3-trifluoro-n-propyl radical, the 2,2,2,2',2',2'-hexafluoroisopropyl radical, the heptafluoroisopropyl radical, and haloaryl radicals such as the o-, m- or p-chlorophenyl radical.

$R^x$ is preferably a hydrogen, alkyl radical or aryl radical, particular preference being given to hydrogen, the methyl radical and the ethyl radical.

If the R radicals are SiC-bonded, substituted hydrocarbon radicals, preferred substituents are halogen atoms, phosphorus-containing radicals, cyano radicals, —$OR^x$, —$NR^x$—, —$NR^x_2$, —$NR^x$—C(O)—$NR^x_2$, —C(O)—$NR^x_2$, —C(O)—$R^x$, —C(O)$OR^x$, —$SO_2$-Ph and —$C_6F_5$ where $R^x$ is as defined above and Ph is a phenyl radical.

Examples of R radicals are alkyl radicals such as the methyl, ethyl, n-propyl, isopropyl, n-butyl, isobutyl, tert-butyl, n pentyl, isopentyl, neopentyl, and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical, and octadecyl radicals such as then octadecyl radical, cycloalkyl radicals such as the cyclopentyl, cyclohexyl, cycloheptyl and methylcyclohexyl radicals, aryl radicals such as the phenyl, naphthyl, anthryl and phenanthryl radicals, alkaryl radicals such as o-, m-, p-tolyl radicals, xylyl radicals and ethylphenyl radicals, and aralkyl radicals such as the benzyl radical, and the α- and the β-phenylethyl radical.

Examples of substituted R radicals are haloalkyl radicals such as the 3,3,3-trifluoro-n-propyl radical, the 2,2,2,2',2',2'-hexafluoroisopropyl radical, the heptafluoroisopropyl radical, haloaryl radicals such as the o-, m- and p-chlorophenyl radicals, —$(CH_2)_n$—$N(R^x)C(O)NR^X_2$, —$(CH_2)_n$—C(O)$NR^x_2$, —$(CH_2)_n$—C(O)$R^x$, $(CH_2)_n$—C(O)$OR^x$, —$(CH_2)_n$—C(O)$NR^x_2$, —$(CH_2)_n$—C(O)—$(CH_2)_m$—C(O)$CH_3$, $(CH_2)_n$—$NR^x$—$(CH_2)_m$—$NR^x_2$, —$(CH_2)_n$—O—CO—$R^x$, —$(CH_2)_n$—C(O)—$(CH_2)_m$—CH(OH)—$CH_2$OH, —$(CH_2)_n$—$(OCH_2CH_2)_m$—$OR^x$, —$(CH_2)_n$—$SO_2$-Ph and $(CH_2)_n$—O—$C_6F_5$, where $R^x$ is as defined above, n and m are identical or different integers from 0 to 10 and Ph denotes the phenyl radical.

Examples of R as bivalent radicals Si-bonded on both sides of the general formula (X) are those which derive from the above monovalent examples mentioned for the R radical by substitution of a hydrogen atom for an additional bond. Examples of such radicals are —$(CH_2)_n$—, —$CH(CH_3)$—, —$C(CH_3)_2$—, —$CH(CH_3)$—$CH_2$—, —$C_6H_4$—, —CH(Ph)-$CH_2$—, —$C(CF_3)_2$—, —$(CH_2)_n$—$C_6H_4$—$(CH_2)_n$—, —$(CH_2)_n$—$C_6H_4$—$C_6H_4$—$(CH_2)_n$—, —$(CH_2O)_m$—, —$(CH_2CH_2O)_m$—, —$(CH_2)_n$—$O_x$—$C_6H_4$—$SO_2$—$C_6H_4$—$O_x$—$(CH_2)_n$—, where x is 0 or 1, m and n are each as defined above and Ph is the phenyl radical.

The R radical is preferably a monovalent, SiC-bonded, optionally substituted hydrocarbon radical which has from 1 to 18 carbon atoms and is free of aliphatic carbon-carbon multiple bonds, more preferably a monovalent SiC-bonded hydrocarbon radical which has from 1 to 6 carbon atoms and is free of aliphatic carbon-carbon multiple bonds, especially the methyl or phenyl radical.

The $R^y$ radicals may be any groups amenable to an addition reaction (hydrosilylation) with an SiH-functional compound.

If the $R^y$ radicals are SiC-bonded, substituted hydrocarbon radicals, preferred substituents are halogen atoms, cyano radicals and —$OR^x$ where $R^x$ is as defined above.

The $R^y$ radicals are preferably alkenyl and alkynyl groups having from 2 to 16 carbon atoms, such as vinyl, allyl, methallyl, 1-propenyl, 5-hexenyl, ethynyl, butadienyl, hexadienyl, cyclopentenyl, cyclopentadienyl, cyclohexenyl, vinylcyclohexylethyl, divinylcyclohexylethyl, norbornenyl, vinylphenyl and styryl radicals, particular preference being given to using vinyl, allyl and hexenyl radicals.

The molecular weight of constituent (A) may vary within wide limits, for instance between $10^2$ and $10^6$ g/mol. For example, constituent (A) may be a relatively low molecular weight alkenyl-functional oligosiloxane such as 1,3-divinyltetramethyldisiloxane, but may also be a highly polymerized polydimethylsiloxane having pendant or terminal Si-bonded vinyl groups, for example having a molecular weight of $10^5$ g/mol (number-average determined by means of NMR). Nor is the structure of the molecules forming constituent (A) fixed; in particular, the structure of a relatively high molecular weight, i.e. oligomeric or polymeric, siloxane may be linear, cyclic, branched or else resinous, network-like. Linear and cyclic polysiloxanes are preferably composed of units of the formula $R_3SiO_{1/2}$, $R^yR_2SiO_{1/2}$, $R^yRSiO_{2/2}$ and $R_2SiO_{2/2}$, where R and $R^y$ are each as defined above. Branched and network-like polysiloxanes additionally contain trifunctional and/or tetrafunctional units, preference being given to those of the formulae $RSiO_{3/2}$, $R^ySiO_{3/2}$ and $SiO_{4/2}$. It will be appreciated that it is also possible to use mixtures of different siloxanes which satisfy the criteria of constituent (A).

As component (A), particular preference is given to the use of vinyl-functional, substantially linear polydiorganosiloxanes having a viscosity of from 0.01 to 500,000 Pa·s, more preferably from 0.1 to 100,000 Pa·s, in each case at 25° C.

The organosilicon compounds (B) used may be all hydrogen-functional organosilicon compounds which have also been used to date in addition-crosslinkable compositions. The organopolysiloxanes (B) used, which have Si-bonded hydrogen atoms, are preferably linear, cyclic or branched organopolysiloxanes composed of units of the average general formula (XI)

$$R_cH_dSiO_{(4-c-d)/2} \quad \text{formula (XI)}$$

in which
R may be the same or different and is as defined above,
c is 0, 1, 2 or 3 and
d is 0, 1 or 2, with the proviso that the sum of c+d is less than or equal to 3 and, on average, at least two Si-bonded hydrogen atoms are present per molecule.

The organopolysiloxane (B) used in accordance with the invention preferably contains Si-bonded hydrogen in the range from 0.04 to 1.7 percent by weight based on the total weight of the organopolysiloxane (B).

The molecular weight of constituent (B) may likewise vary within wide limits, for instance between $10^2$ and $10^6$ g/mol. For example, constituent (B) may be a relatively low molecular weight SiH-functional oligosiloxane, such as tetramethyldisiloxane, but also a highly polymerized polydimethylsiloxane having pendant or terminal SiH groups, or a silicone resin having SiH groups. Nor is the structure of the molecules which form constituent (B) fixed; in particular, the structure of a relatively high molecular weight, i.e. oligomeric or polymeric, SiH-containing siloxane may be linear, cyclic, branched or else resinous, network-like. Linear and cyclic polysiloxanes are preferably composed of units of the formula $R_3SiO_{1/2}$, $HR_2SiO_{1/2}$, $HRSiO_{2/2}$ and $R_2SiO_{2/2}$ where R is as defined above. Branched and network-like polysiloxanes additionally contain trifunctional and/or tetrafunctional units, preference being given to those of the formulae $RSiO_{3/2}$, $HSiO_{3/2}$ and $SiO_{4/2}$. It will be appreciated that it is also possible to use mixtures of different siloxanes which satisfy the criteria of constituent (B). In particular, the molecules which form constituent (B), in addition to the obligatory SiH groups, may optionally at the same time also contain aliphatically unsaturated groups. Particular preference is given to the use of low molecular weight SiH-functional compounds such as tetrakis(dimethylsiloxy)silane and tetramethylcyclotetrasiloxane, and also higher molecular weight, SiH-containing siloxanes such as poly(hydromethyl)siloxane and poly(dimethylhydromethyl)siloxane with a viscosity at 25° C. of from 10 to 10,000 mPa·s, or analogous SiH-containing compounds in which some of the methyl groups have been replaced by 3,3,3-trifluoropropyl or phenyl groups.

Constituent (B) is present in the inventive crosslinkable overall silicone compositions preferably in such an amount that the molar ratio of SiH groups to aliphatically unsaturated groups is from 0.1 to 20, more preferably between 1.0 and 5.0.

The components (A) and (B) used in accordance with the invention are commercial products or preparable by processes common in chemistry.

Instead of component (A) and (B), the inventive compositions may comprise organopolysiloxanes (C) which have aliphatic carbon-carbon multiple bonds and Si-bonded hydrogen atoms.

If siloxanes (C) are used, they are preferably those composed of units of the formulae $$R_gSiO_{4-g/2}, R_hR^ySiO_{3-h/2} \text{ and } R_iHSiO_{3-i/2},$$

where R and $R^y$ are each as defined above, g is 0, 1, 2 or 3, h is 0, 1 or 2 and i is 0, 1 or 2, with the proviso that at least 2 $R^y$ radicals and at least 2 Si-bonded hydrogen atoms are present per molecule.

Examples of organopolysiloxanes (C) are those composed of $SiO_{4/2}$, $R_3SiO_{1/2}$, $R_2R^ySiO_{1/2}$ and $R_2HSiO_{1/2}$ units, so-called MQ resins which may additionally contain $RSiO_{3/2}$ and $R_2SiO$ units, and also linear organopolysiloxanes substantially consisting of $R_2R^ySiO_{1/2}$, $R_2SiO$ and RHSiO units where R and $R^y$ are each as defined above.

The organopolysiloxanes (C) preferably have an average viscosity of from 0.01 to Pa·s, more preferably from 0.1 to 100,00 Pa·s, in each case at 25° C.

Organopolysiloxanes (C) are preparable by methods common in chemistry.

Apart from components (A) to (D), the inventive curable compositions may also comprise all further substances which have also been used to date to produce addition-crosslinkable materials.

Examples of reinforcing fillers which may be used as component (E) in the inventive materials are fumed or precipitated silicas having BET surface areas of at least 50 m²/g, and also carbon blacks and activated carbons such as furnace black and acetylene black, preference being given to fumed and precipitated silicas having BET surface areas of at least 50 m²/g.

These silica fillers may have hydrophilic character or be hydrophobized by known processes. When hydrophilic fillers are incorporated, the addition of a hydrophobizing agent is required.

The content in the inventive crosslinkable material of actively reinforcing filler (E) is in the range from 0 to 70% by weight, preferably from 0 to 50% by weight.

The inventive compositions, especially the polyorganosiloxane materials, may optionally comprise, as constituent (F), further additives in a proportion of up to 70% by weight, preferably from 0.0001 to 40% by weight. These additives may, for example, be inactive fillers, resinous polyorganosiloxanes other than siloxanes (A), (B) and (C), dispersing assistants, solvents, adhesion promoters, pigments, dyes, plasticizers, organic polymers, heat stabilizers, etc. They include additives such as quartz flour, diatomaceous earth, clays, chalk, lithopone, carbon blacks, graphite, metal oxides, metal carbonates and sulfates, metal salts of carboxylic acids, metal dusts, fibers such as glass fibers, polymer fibers, polymer powders, dyes, pigments, etc.

The inventive compositions, especially the organopolysiloxane materials, can be prepared by known processes, for example by homogeneously mixing the individual components. The sequence is as desired, but preference is given to the homogeneous mixing of the inventive ruthenium catalyst (D) with a mixture of (A) and (B) or (C), and optionally (E) and (F). The ruthenium catalyst (D) used in accordance with the invention can be incorporated as a solid substance or as a so-called batch—mixed homogeneously with a small amount of (A) or (A) with (E). The mixing is effected, depending on the viscosity of (A), for example, with a stirrer, in a dissolver, on a roller or in a kneader.

The examples which follow serve to illustrate the inventive use, the process according to the invention and the inventive compositions, and should in no way at all be considered as a restriction.

EXAMPLES

Example 1

Hydrosilylation of $HMe_2SiO—[SiMe_2O]_x—SiMe_2H$ ($x \approx 13$) (H-polymer 13) with 3-vinylheptamethyltrisiloxane A mixture of 3.8 g (approx. 4 mmol) of H-polymer 13 and 1.99 g (8 mmol) of 3-vinylheptamethyltrisiloxane is admixed with the appropriate amount of an Ru catalyst (300 ppm of Ru) and stirred at 120° C. under an argon atmosphere. The hydrosilylation reaction (conversion, selectivity, yield) is analyzed by $^1$H NMR.

| Catalyst | Reaction time | Conversion | Selectivity | Yield |
|---|---|---|---|---|
| $Ru(\eta^4\text{-COD})(\eta^6\text{-COT})$ | 1 h | 100 | 71 | 71 |
| $Ru(\eta^4\text{-COD})(2\text{-methallyl})_2$ | 1 h | 100 | 65 | 65 |
| $Ru(\eta^6\text{-p-cymene})(\eta^4\text{-COD})$ | 1 h | 91 | 83 | 76 |
| $Ru(\eta^6\text{-toluene})(dmfm)_2$ | 1 h | 99 | 87 | 86 |
| $Ru(\eta^6\text{-}C_6H_6)(\eta^4\text{-}C_6H_8)$ | 1 h | 48 | 79 | 38 |
| $Ru(\eta^6\text{-}C_6H_6)(\eta^4\text{-}C_6H_8)$ | 2 h | 69 | 84 | 58 |
| $(\eta^5\text{-Cp*})Ru(Cl)\eta^4\text{-COD})$ | 1 h | 69 | 69 | 48 |
| $(\eta^5\text{-Cp*})Ru(Cl)\eta^4\text{-COD})$ | 2 h | 84 | 70 | 58 |
| Comparative Examples | | | | |
| $Ru(PPh_3)_3Cl_2$ | 2 h | 72 | 19 | 14 |
| $Ru(CO)_3(PPh_3)_2$ | 2 h | 75 | 72 | 54 |
| $RuCl_3 * 3H_2O$ | 2 h | 2 | 20 | 1 |
| $K_2RuCl_5 * XH_2O$ | 2 h | 65 | 75 | 49 |
| $[RuCl_2(CO)_3]_2$ | 2 h | 93 | 13 | 12 |
| $CpRu(PPh_3)_2Cl$ | 2 h | 66 | 44 | 29 |
| $[Pt_2(TMDVS)_3]$, "Karstedt catalyst" (100 ppm Pt) | 1 h | 100 | 91 | 91 |

Legend:
COD = 1,5-cyclooctadiene;
COT = 1,3,5-cyclo-octatriene;
dmfm = dimethyl fumarate; $(\eta^4\text{-}C_6H_8)$ = 1,3-cyclohexadiene;
Cp* = pentamethylcyclopentadienyl;
TMDVS = tetramethyldivinyldisiloxane

Example 2

Crosslinking of an α,ω-divinylpolydimethylsiloxane with an SiH-Functional Polysiloxane at 120° C.

10 g of an α,ω-divinylpolydimethylsiloxane, viscosity η=500 mPa·s (name within Wacker VIPO 500) are admixed with the Ru catalyst (300 ppm of Ru based on the total mass of the mixture), mixed vigorously in a round-bottom flask while treating with ultrasound and admixed with 250 mg of an SiH-functional polysiloxane of the formula $Me_3SiO—[Si(H)Me\text{-}O]_{48}—SiMe_3$ (name within Wacker V24 crosslinker) and mixed vigorously once again. The mixture is stirred in a preheated oil bath at 120° C. and 500 rpm under argon. The time until the gelation has progressed to such an extent that stirring with a magnetic stirrer bar is no longer completely possible is determined.

| Catalyst | Gelation time |
|---|---|
| $Ru(\eta^4\text{-COD})(\eta^6\text{-COT})$ | 25 s |
| $Ru(\eta^4\text{-COD})(2\text{-methallyl})_2$ | 1 min. 45 s |
| $Ru(\eta^6\text{-p-cymene})(\eta^4\text{-COD})$ | 2 min. 40 s |
| $Ru(\eta^6\text{-}C_6H_6)(\eta^4\text{-}C_6H_8)$ | 5 min. |
| $(\eta^5\text{-Cp*})Ru(Cl)\eta^4\text{-COD})$ | 8 min. 30 s |
| Comparative Examples | |
| $[(p\text{-cymene})RuCl_2]_2$ | 38 min. |
| $Ru(CO)_3(PPh_3)_2$ | >5 h |
| $K_2RuCl_5 * xH_2O$ | >5 h |
| $RuCl_3 * 3H_2O$ | >5 h |
| $[Pt_2(TMDVS)_3]$, "Karstedt catalyst" (100 ppm Pt) | <5 s |

Legend:
COD = 1,5-cyclooctadiene;
COT = 1,3,5-cyclo-octatriene;
$(\eta^4\text{-}C_6H_8)$ = 1,3-cyclohexadiene;
Cp* = penta-methylcyclopentadienyl;
TMDVS = tetramethyldivinyl-disiloxane

Example 3

Crosslinking of an α,ω-divinylpolydimethylsiloxane with an SiH-Functional Polysiloxane at Room Temperature (Approx. 20° C.)

The mixture from Example 2 is left to stand under argon at room temperature (approx. 20° C.) and the time until the system is no longer free-flowing ("pot life") is determined.

| Catalyst | "Pot life" |
| --- | --- |
| $Ru(\eta^4\text{-COD})(\eta^6\text{-COT})$ | 1 min. |
| $Ru(\eta^4\text{-COD})(2\text{-methallyl})_2$ | 2 h 10 min. |
| $Ru(\eta^6\text{-}C_6H_6)(\eta^4\text{-}C_6H_8)$ | 8 h |
| Comparative Examples | |
| $[(\text{p-cymene})RuCl_2]_2$ | >1 d |
| $Ru(CO)_3(PPh_3)_2$ | >1 d |
| $K_2RuCl_5 * xH_2O$ | >1 d |
| $RuCl_3 * 3H_2O$ | >1 d |

Legend:
COD = 1,5-cyclooctadiene;
COT = 1,3,5-cyclo-octatriene;
$(\eta^4\text{-}C_6H_8)$ = 1,3-cyclohexadiene

Example 4

Crosslinking of an α,ω-divinylpolydimethylsiloxane with an SiH-Functional Polysiloxane in thin Layers at 120° C.

The mixture from Example 2 is applied to a microscope slide as a layer with a doctor blade (60μ) and heated on a heating bench at 120° C.

The quality of the crosslinking is determined by a smear or rub-off test, which is carried out after certain times, with a rating according to the following criteria:

6: fluid system
5: fluid system with partially crosslinked zones
4: crosslinked layer, destroyed after 1 finger rub
3: crosslinked layer, destroyed after 2-4 finger rubs
2: crosslinked layer, destroyed after >4 finger rubs
1: crosslinked layer which cannot be destroyed by finger rubs

| Catalyst | Microscope slide |
| --- | --- |
| $Ru(\eta^4\text{-COD})(\eta^6\text{-COT})$ | Coating with 300 ppm of Ru impossible, since immediate viscosity rise at room temperature |
| $Ru(\eta^6\text{-}C_6H_6)(\eta^4\text{-}C_6H_8)$ | 30 s: 5<br>5 min.: 4 |
| $Ru(\eta^4\text{-COD})(2\text{-methallyl})_2$ | 5 s: 5<br>10 s: 4<br>30 s: 3<br>10 min.: 2 |
| Comparative Example | |
| $Ru(CO)_3(PPh_3)_2$ | 10 min.: 6 |

Example 5

Crosslinking of an α,ω-divinylpolydimethylsiloxane with an SiH-Functional Polysiloxane in Thin Layers at 120° C. with Addition of a Solvent 10 g of an α,ω-divinylpolydimethylsiloxane, viscosity η=500 mPa·s (name within Wacker VIPO 500) are admixed with a solution of the Ru catalyst (300 ppm of Ru based on the total mass of the mixture) in an organic solvent and mixed intensively. Subsequently, the homogeneous mixture is stirred under reduced pressure at $10^{-2}$ mbar for 15 min and admixed at standard pressure with 250 mg of an SiH-functional polysiloxane of the formula $Me_3SiO\text{—}[Si(H)Me\text{-}O]_{48}$ —$SiMe_3$ (name within Wacker V24 crosslinker) and mixed intensively once more. In analogy to Example 4, the mixture is applied with a doctor blade (60μ) as a layer to a glass microscope slide and heat-treated at 120° C. on a heating bench. The quality of the crosslinking is again determined by smear—or rub off test after particular times, with rating according to the criteria specified in Example 4.

| Catalyst | Amount of solvent | Microscope slide |
| --- | --- | --- |
| $Ru(\eta^4\text{-COD})(\eta^6\text{-COT})$/THF | 1.5% by weight of THF | 7 s: 1 |
| $Ru(\eta^6\text{-p-cymene})(\eta^4\text{-COD})$/toluene | 2% by weight of toluene | 30 s: 3<br>2 min.: 2<br>4 min.: 1 |
| $Ru(\eta^6\text{-}C_6H_6)(\eta^4\text{-}C_6H_8)/CH_2Cl_2$ | 1% by weight of $CH_2Cl_2$ | 20 s: 5<br>1 min.: 4<br>10 min.: 3<br>20 min.: 2 |
| $Ru(\eta^4\text{-COD})(2\text{-methallyl})_2/CH_2Cl_2$ | 0.5% by weight of $CH_2Cl_2$ | 5 s: 5<br>10 s: 4<br>30 s: 3<br>1 min.: 2<br>10 min.: 1 |

Legend:
COD = 1,5-cyclooctadiene;
COT = 1,3,5-cyclooctatriene;
THF = tetrahydrofuran;
$(\eta^4\text{-}C_6H_8)$ = 1,3-cyclohexadiene Example 5 shows that the homogenization with the aid of a solvent is advantageous with regard to layer formation (cf. the corresponding examples without solvent in Example 4).

Example 6

Crosslinking of an α,ω-divinylpolydimethylsiloxane with an SiH-Functional Polysiloxane in Thin Layers at 120° C. using $Ru(\eta^4\text{-COD})(\eta^6\text{-COT})$ as a Catalyst with 50 ppm of Ru Analogous to Example 4, using $Ru(\eta^4\text{-COD})(\eta^6\text{-COT})$ as the catalyst with 50 ppm of Ru

| Catalyst | Microscope slide |
| --- | --- |
| $Ru(\eta^4\text{-COD})(\eta^6\text{-COT})$ | 30 s: 5<br>1 min.: 4<br>20 min.: 3 |

Legend:
COD = 1,5-cyclooctadiene;
COT = 1,3,5-cycloctatriene

Example 6 shows that, with Ru($\eta^4$-COD) ($\eta^6$-COT), a crosslinked layer can be obtained even with 50 ppm of Ru.

The invention claimed is:

1. A process for preparing crosslinked silicones by hydrosilylation comprising reacting a first compound (A) containing at least two Si—H functionalities with at least a second compound (B) containing at least two hydrosilylatable unsaturated carbon-carbon bonds in the presence of a ruthenium catalyst (D) having at least two ndependent carbon π-bonded ligands, at least one of these ligands being selected from the group consisting of $\eta^6$-bonded arene ligands, $\eta^6$-bonded triene ligands, $\eta^4$-bonded 1,5-cyclooctadiene ligands and $\eta^4$-bonded 1,3,5-cyclooctatriene ligands, wherein at least one of compounds (A) or (B) contain at least three of their respective Si—H or hydrosilylatable unsaturated carbon-carbon bonds, to produce a crosslinked silicone product.

2. The process of claim 1, wherein the ruthenium catalyst is a compound of the formula (1)

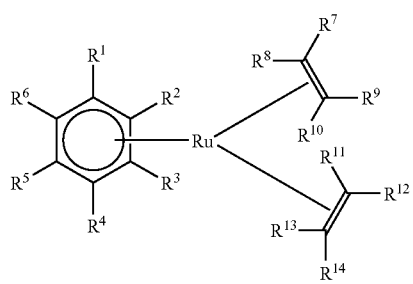

Formula (1)

where
$R^1$ to $R^6$ are each independently hydrogen, alkyl, aryl, halogen, OR' where R' is hydrogen, alkyl or aryl, $CO_2R''$ where R'' is hydrogen or alkyl, or CHO or C(O)R''' where R''' is alkyl or aryl, with the proviso that two adjacent $R^1$ to $R^6$ radicals may optionally form a ring structure; and
$R^7$ to $R^{14}$ are each independently hydrogen, alkyl, aryl, halogen, silyl, siloxy, CN; $CO_2R''$ where R'' is hydrogen or alkyl, or CHO or C(O)R''' where R''' is alkyl or aryl, with the proviso that radicals from $R^7$ to $R^{10}$ and from $R^{11}$ to $R^{14}$, with or without additional spacing groups may optionally be joined to one another, thus forming a polydentate acyclic or cyclic ligand.

3. The process of claim 1, wherein the ruthenium catalyst is a compound of the formula (2)

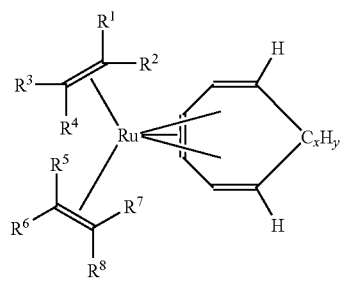

Formula (2)

where
$R^1$ to $R^8$ are each independently hydrogen, alkyl, aryl, halogen, silyl, siloxy, CN, $CO_2R''$ where R'' is hydrogen or alkyl, CHO, or C(O)R''' where R''' is alkyl, aryl or $NR_2$ where R is hydrogen or alkyl, with the proviso that radicals from $R^1$ to $R^4$ and $R^5$ to $R^8$, with or without additional spacing groups may optionally be joined to one another forming a polydentate acyclic or cyclic ligand; and
x=1 and y=2;
x=2 and y=2; or
x=2 and y=4.

4. The process of claim 1, wherein the ruthenium catalyst is a compound of the formula (4)

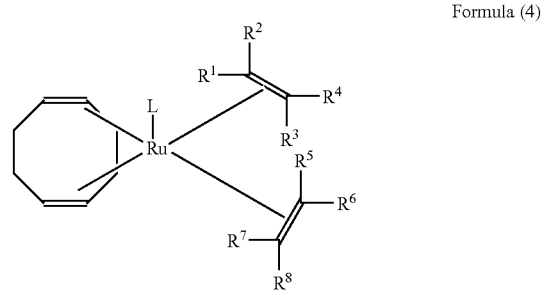

Formula (4)

where
$R^1$ to $R^8$ are each independently hydrogen, alkyl, aryl, halogen, silyl, siloxy, CN, $CO_2R''$ where R'' is hydrogen or alkyl, or CHO or C(O)R''' where R''' is alkyl or aryl, with the proviso that radicals from $R^1$ to $R^4$ and $R^5$ to $R^8$, with or without additional spacing groups, may optionally be joined to one another forming, a polydentate acyclic or cyclic ligand; and
L is CO; CNR''' where R''' is alkyl or aryl, $PR_3'''$ or $P(OR''')_3$ where R''' is alkyl or aryl, ligands containing N donors, ligands containing S donors, and ligands containing O donors.

5. The process of claim 1, wherein the ruthenium compound used in component (D) is a compound of the formula (1)

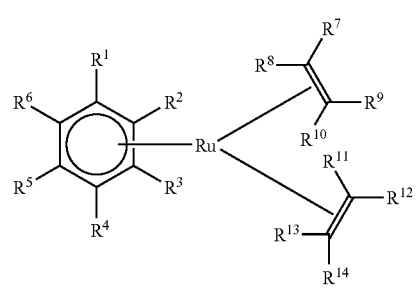

Formula (1)

where
$R^1$ to $R^6$ are each independently hydrogen, alkyl, aryl, halogen, OR' where R' is hydrogen, alkyl or aryl, $CO_2R''$ where R'' is hydrogen or alkyl, or CHO or C(O)R''' where R''' is alkyl or aryl, with the proviso that two adjacent $R^1$ to $R^6$ radicals may optionally form a ring structure; and
$R^7$ to $R^{14}$ are each independently hydrogen, alkyl, aryl, halogen, silyl, siloxy, CN; $CO_2R''$ where R'' is hydrogen or alkyl, or CHO or C(O)R''' where R''' is alkyl or aryl, with the proviso that radicals from $R^7$ to $R^{10}$ and from $R^{11}$ to $R^{14}$, with or without additional spacing groups may optionally be joined to one another, thus forming a polydentate acyclic or cyclic ligand.

6. The process of claim 1, wherein the ruthenium compound used in component (D) is a compound of the formula (2)

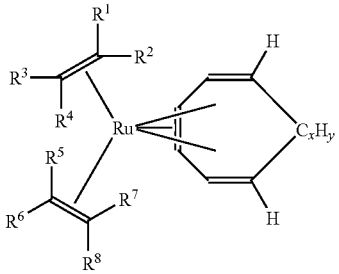

Formula (2)

where
R$^1$ to R$^8$ are each independently hydrogen, alkyl, aryl, halogen, silyl, siloxy, CN, CO$_2$R" where R" is hydrogen or alkyl, or CHO or C(O)R'" where R'" is alkyl, aryl or NR$_2$ where R is hydrogen or alkyl, with the proviso that radicals from R$^1$ to R$^4$ and R$^5$ to R$^8$, with or without additional spacing groups may optionally be joined to one another forming a polydentate acyclic or cyclic ligand; and
x=1 and y=2;
x=2 and y=2; or
x=2 and y=4.

7. A process for hydrosilylation comprising reacting at least one Si—H functionality with at least one hydrosilylatable unsaturated carbon-carbon bond in the presence of a ruthenium catalyst having at least two independent carbon π-bonded ligands, at least one of these ligands being selected from the group consisting of η$^6$-bonded arene ligands, η$^6$-bonded triene ligands, η$^4$-bonded 1,5-cyclooctadiene ligands and η$^4$-bonded 1,3,5-cyclooctatriene ligands wherein the ruthenium catalyst is at least one catalyst selected from the group consisting of compounds of the formula (3)

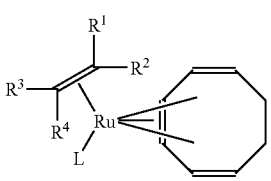

Formula (3)

where
R$^1$ to R$^4$ are each independently hydrogen, alkyl, aryl, halogen, silyl, siloxy, CN, CO$_2$R" where R" is hydrogen or alkyl, or CHO or C(O)R'" where R'" is alkyl or aryl; and
L is PR$_3$'" or P(OR'")$_3$, where R'" is alkyl or aryl, NR$_2$H where R is hydrogen, alkyl or alkylaryl, morpholine, or pyridine;

compounds of the formula (5)

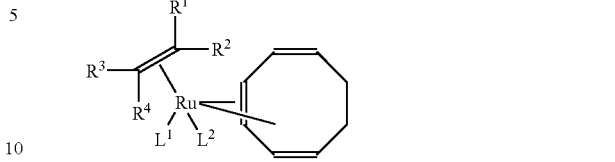

Formula (5)

where
R$^1$ to R$^4$ are each independently hydrogen, alkyl, aryl, halogen, silyl, siloxy, CN, CO$_2$R" where R" is hydrogen or alkyl, or CHO or C(O)R'" where R'" is alkyl or aryl; and
L$^1$ and L$^2$ are each independently CO, CNR'" where R'" is alkyl or aryl, PR$_3$'" or P(OR'")$_3$ where R'" is alkyl or aryl, ligands containing N donors, ligands containing S donors, and ligands containing O donors, with the proviso that L$^1$ and L$^2$ may optionally be joined to one another and optionally form a ring;
compounds of the formula (6)

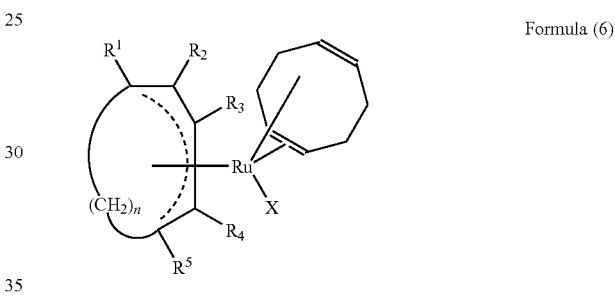

Formula (6)

where R$^1$ to R$^5$ are each independently hydrogen, alkyl, or aryl, and the dotted line in the formula (6) represents one or more conjugated or nonconjugated double bonds;
n is 0, 2 or 3; and
X is any monovalent anionic ligand;
or compounds of the formula (7)

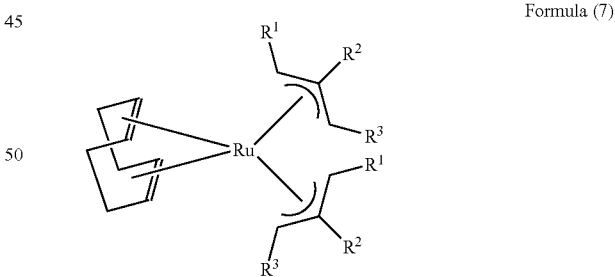

Formula (7)

where
R$^1$ to R$^3$ are each independently hydrogen or alkyl.

8. A hydrosilylatable composition useful in a process of hydrosilation comprising
(A) at least one compound with at least one silicon-hydrogen bond, and
(B) at least one compound with at least one aliphatically unsaturated carbon-carbon bond,
(D) a ruthenium compound having a ligand sphere comprising at least two independent carbon π-bonded ligands, at least one of these ligands being selected from the group consisting of $\eta^6$-bonded arene ligands, $\eta^6$-bonded triene ligands, $\eta^4$-bonded 1,5-cyclooctadiene ligands and $\eta^4$-bonded 1,3,5-cyclooctatriene ligands, wherein at least one ruthenium compound is selected from the group consisting of compounds of the formula (3)

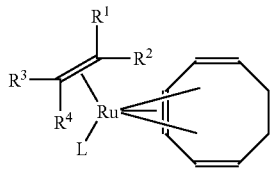

Formula (3)

where $R^1$ to $R^4$ are each independently hydrogen, alkyl, aryl, halogen, silyl, siloxy, CN, $CO_2R''$ where R'' is hydrogen or alkyl, or CHO or $C(O)R'''$ where R''' is alkyl or aryl; and L is $PR_3'''$ or $P(OR''')_3$, where R''' is alkyl or aryl, $NR_2H$ where R is hydrogen, alkyl or alkylaryl, morpholine, or pyridine;

compounds of the formula (5)

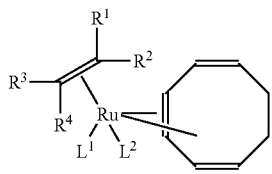

Formula (5)

where $R^1$ to $R^4$ are each independently hydrogen, alkyl, aryl, halogen, silyl, siloxy, CN, $CO_2R''$ where R'' is hydrogen or alkyl, or CHO or $C(O)R'''$ where R''' is alkyl or aryl; and $L^1$ and $L^2$ are each independently CO, CNR''' where R''' is alkyl or aryl, $PR_3'''$ or $P(OR''')_3$ where R''' is alkyl or aryl, ligands containing N donors, ligands containing S donors, and ligands containing O donors, with the proviso that $L^1$ and $L^2$ may optionally be joined to one another and optionally form a ring;

compounds of the formula (6)

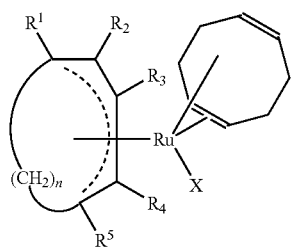

Formula (6)

where $R^1$ to $R^5$ are each independently hydrogen, alkyl, or aryl, and the dotted line in the formula (6) represents one or more conjugated or nonconjugated double bonds;

n is 0, 2 or 3; and

X is any monovalent anionic ligand; and compounds of the ormula (7)

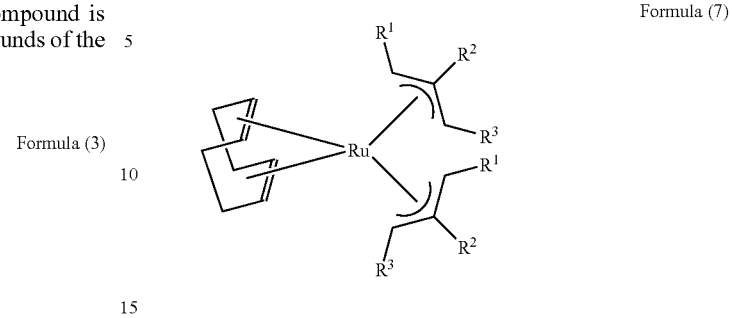

Formula (7)

where $R^1$ to $R^3$ are each independently hydrogen or alkyl.

9. A silicone elastomer obtained by crosslinking a hydrosilylatable composition of claim 8.

10. A coating obtained by crosslinking a hydrosilylatable composition of claim 8.

11. A process for hydrosilylation comprising reacting at least one Si—H functionality with at least one hydrosilylatable unsaturated carbon-carbon bond in the presence of a ruthenium catalyst having at least two independent carbon π-bonded ligands, at least one of these ligands being selected from the group consisting of $\eta^6$-bonded arene ligands, $\eta^6$-bonded triene ligands, $\eta^4$-bonded 1,5-cyclooctadiene ligands and $\eta^4$-bonded 1,3,5-cyclooctatriene ligands wherein the ruthenium catalyst is a compound selected from the group consisting of a compound of the formula (2)

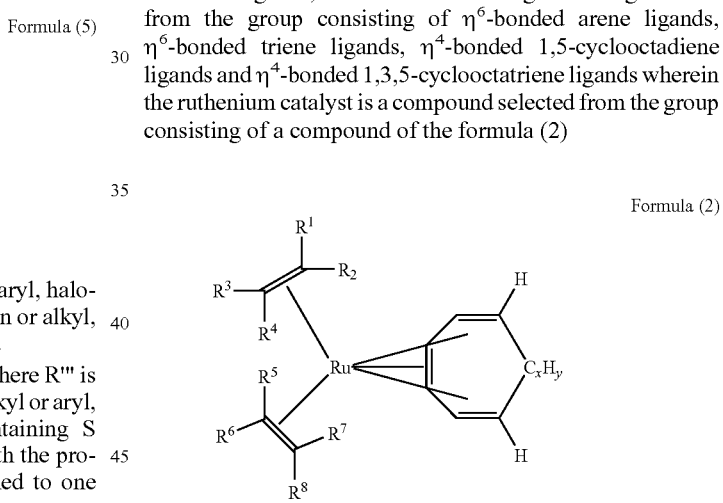

Formula (2)

where $R^1$ to $R^8$ are each independently hydrogen, alkyl, aryl, halogen, silyl, siloxy, CN, $CO_2R''$ where R'' is hydrogen or alkyl, CHO, or $C(O)R'''$ where R''' is alkyl, aryl or $NR_2$ where R is hydrogen or alkyl, and x=1 and y=2;

x=2 and y=2; or x=2 and y=4.

12. A process for hydrosilylation comprising reacting at least one Si—H functionality with at least one hydrosilylatable unsaturated carbon-carbon bond in the presence of a ruthenium catalyst having at least two independent carbon π-bonded ligands, at least one of these ligands being selected from the group consisting of $\eta^6$-bonded arene ligands, $\eta^6$-bonded triene ligands, $\eta^4$-bonded 1,5-cyclooctadiene ligands and $\eta^6$-bonded 1,3,5-cyclooctatriene ligands wherein the ruthenium catalyst is selected from the group consisting of compounds of the formula (4)

Formula (4) 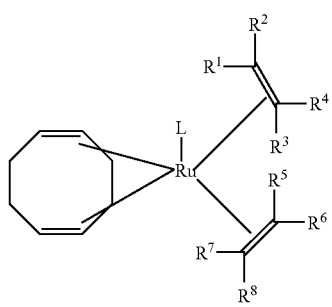

where
R¹ to R⁸ are each independently hydrogen, alkyl, aryl, halogen, silyl, siloxy, CN, $CO_2R''$ where R'' is hydrogen or alkyl, or CHO or $C(O)R'''$ where R''' is alkyl or aryl, with the proviso that radicals from R¹ to R⁴ and R⁵ to R⁸, with or without additional spacing groups, may optionally be joined to one another forming, a polydentate acyclic or cyclic ligand; and L is CO; CNR''' where R''' is alkyl or aryl, ligands containing S donors, and ligands containing O donors.

* * * * *

UNITED STATES PATENT AND TRADEMARK OFFICE
CERTIFICATE OF CORRECTION

PATENT NO. : 7,803,893 B2
APPLICATION NO. : 12/296369
DATED : September 28, 2010
INVENTOR(S) : Marco Hofmann et al.

It is certified that error appears in the above-identified patent and that said Letters Patent is hereby corrected as shown below:

Column 21, Line 9, Claim 1:
Delete "ndependent" and insert -- independent --.

Column 26, Line 1, Claim 8:
Delete "ormula" and insert -- formula --.

Column 26, Line 65, Claim 11:
Delete "$\eta^6$-bonded 1,3,5-cyclooctatriene ligands" and insert -- $\eta^4$-bonded 1,3,5-cyclooctatriene ligands --.

Signed and Sealed this

Fourteenth Day of December, 2010

David J. Kappos
*Director of the United States Patent and Trademark Office*